(12) United States Patent
Whytock

(10) Patent No.: US 11,790,189 B1
(45) Date of Patent: Oct. 17, 2023

(54) SYSTEM AND METHOD FOR DETECTING A FOREIGN OBJECT

(71) Applicant: NCR Corporation, Atlanta, GA (US)

(72) Inventor: Alexander William Whytock, Perthshir (GB)

(73) Assignee: NCR Corporation, Atlanta, GA (US)

( * ) Notice: Subject to any disclaimer, the term of this patent is extended or adjusted under 35 U.S.C. 154(b) by 0 days.

(21) Appl. No.: 17/900,438

(22) Filed: Aug. 31, 2022

(51) Int. Cl.
    *G06K 7/10*     (2006.01)
    *G06K 7/00*     (2006.01)

(52) U.S. Cl.
    CPC ....... *G06K 7/10257* (2013.01); *G06K 7/0004* (2013.01)

(58) Field of Classification Search
    CPC .................. G06K 7/10257; G06K 7/0004
    See application file for complete search history.

(56) References Cited

U.S. PATENT DOCUMENTS

| | | | |
|---|---|---|---|
| 9,754,462 B2 * | 9/2017 | Wiesinger | G07F 19/2055 |
| 10,629,035 B2 * | 4/2020 | Hodges | G07F 19/2055 |
| 11,222,514 B1 | 6/2022 | Young et al. | |
| 2022/0114351 A1 | 4/2022 | McGrath | |

FOREIGN PATENT DOCUMENTS

DE     102011010737 A1 *   8/2012   .......... G07F 19/201

* cited by examiner

*Primary Examiner* — Seung H Lee
(74) *Attorney, Agent, or Firm* — NOTARO, MICHALOS & ZACCARIA P.C.; John S. Economou

(57) ABSTRACT

A system and method is described for detecting a foreign object inserted into a card reader. The card reader has a housing having an internal portion and a card entry slot formed therein. A reader device for reading information from a card is mounted within the internal portion of the housing. A transport mechanism is within the internal portion of the housing and includes a structure having one or more distinctive patterns on an upper surface thereof. A camera is mounted within the housing above the transport mechanism in a position to allow an image to be taken of the upper surface of the structure of the transport mechanism. A controller is coupled to the camera to receive images therefrom and configured to compare each image received from the camera to a reference image to determine when a foreign object has been inserted into the internal portion of the housing.

18 Claims, 5 Drawing Sheets

SYSTEM AND METHOD FOR DETECTING A FOREIGN OBJECT

FIELD

This disclosure relates generally to a system and method for detecting the presence of a foreign object, such as a deep insert skimmer, placed internally within a card reader for a self-service terminal such as an automated teller machine (ATM).

BACKGROUND

Many self-service terminals include motorized mechanisms for reading bank cards or other type of access cards which receive a card tendered by a customer at an externally-located input slot and then transport the card to an internal location so that information encoded on the card can be read via a magnetic stripe on the card or an integrated circuit embedded in the card. Unauthorized reading of card data, such as data encoded on the magnetic stripe of the customer's card, while the card is being used ("card skimming"), is a known type of fraud. Although card skimming is most often done by adding a skimmer, i.e., an assembly including a separate magnetic read head, to the front fascia of self-service terminal, bad actors have now developed "deep insert skimmers" that are placed internally within the motorized card reader mechanism of the self-service terminal.

Accordingly, there is a need for a system and method for detecting the presence of a skimmer placed in an internal portion of a self-service terminal.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

Figure 1:
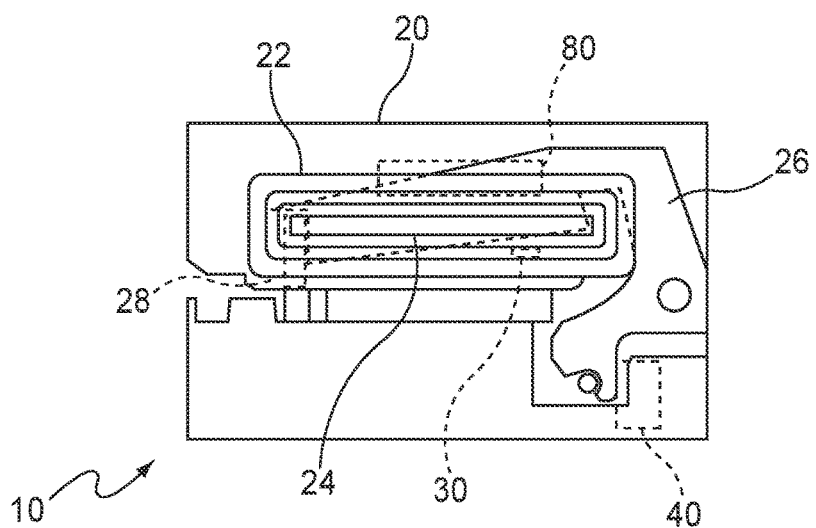
FIG. 1 is a front view of a motorized card reader according to an embodiment of the present disclosure.
Figure 2:
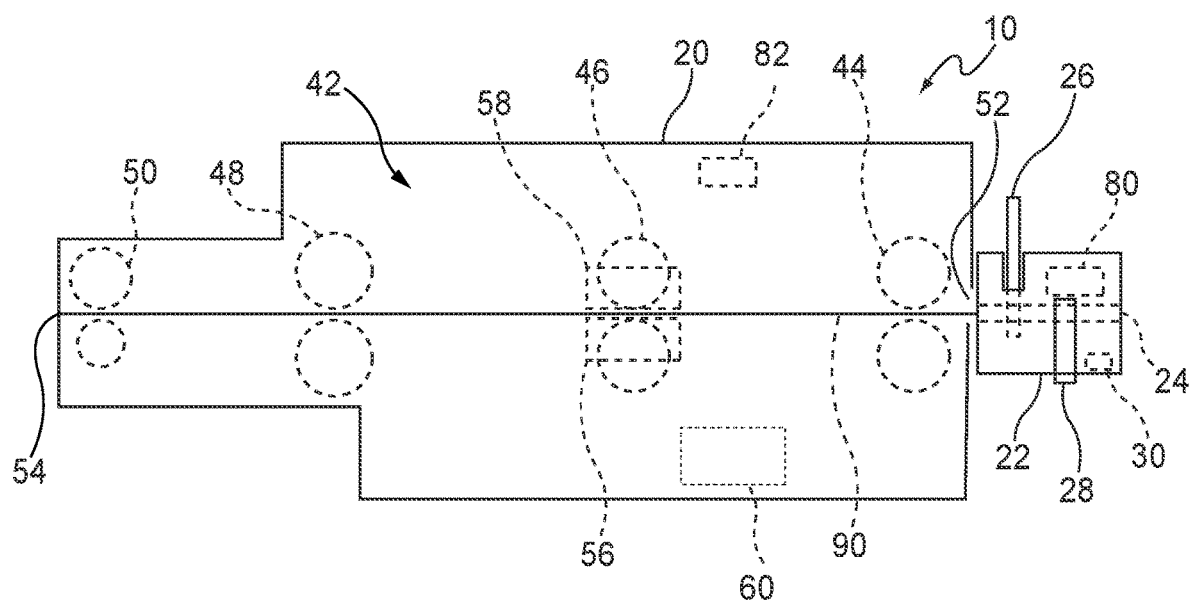
FIG. 2 is a simplified side view of the motorized card reader of FIG. 1.

Referring now to FIGS. 1 and 2, respective front and side views are depicted of a motorized card reader 10 that includes an internal camera 82 for use in detecting any foreign structure, such as a deep insert skimmer, inserted within the internal portions of card reader 10. Card reader 10 is often referred to as a motorized card reader/writer (MCRW) device. The card reader 10 is intended to be incorporated into a self-service terminal, such as an automated teller machine (ATM), a non-cash kiosk, a self-checkout terminal, a check-in/check-out terminal, or the like. Magnetic stripe cards and chip-based smart cards are two versions of credit or debit cards (collectively "bank cards" or a "bank card" hereinafter) for use with a self-service terminal.

The card reader 10 comprises a card enclosure having a main housing 20 which is coupled to a card entrance housing 22. The card entrance housing 22 defines a card entry slot 24 dimensioned for receiving a bank card such as the magnetic stripe card or chip-based smart card by the leading edge first. The card entrance housing 22 also includes a shutter 26 pivotally coupled to the main housing 20 for controlling access from the card entrance housing 22 to the main housing 20.

When the shutter 26 is in the open position, the bank card (i.e., magnetic stripe card or a chip-based smart card) may be transported from the card entrance housing 22 to the main housing 20 along a guide member structure 90; whereas, with the shutter 26 in the closed position no card may pass between the card entrance housing 22 and the main housing 20. Once the leading edge of the bank card passes the shutter 26, the shutter 26 is released and biased against the top of the bank card so that the shutter 26 automatically closes once the trailing edge of the bank card clears the shutter 26. As understood, bad actors typically attempt to install a deep insert skimmer while performing a transaction at the self-service terminal while shutter 26 is open.

The card entrance housing 22 may include three sensors mounted therein for verifying that an object inserted by the customer is actually a bank (or credit) card and has been inserted in the proper orientation. The shutter 26 is preferably only opened when the correct signals are received from two of the three sensors.

The first sensor is a card width detection sensor 28. The card width detection sensor 28 is deflected by the bank card on insertion and ejection of the card. If a customer inserts a card into the card entrance housing 22 then the card width detection sensor 28 detects the presence of this card. The card width detection sensor 28 verifies that the inserted bank card has the correct width.

The second sensor is a input read head 30, in the form of a magnetic flux detector. This input read head 30 is located at a point in the card entrance housing 22 over which the magnetic stripe of the magnetic stripe card should pass before the magnetic stripe card enters the shutter 26. The input read head 30, in combination with controller 60 discussed below, verifies that, when the inserted bank card is a magnetic stripe card, it has been correctly oriented (i.e., not upside down or backwards) based on the ability to properly read valid information from the magnetic stripe.

The third sensor is an external camera 80 installed just above the card entrance slot 24. Controller 60 receives images from external camera 80 and processes such images to determine if the inserted card is a chip-based smart card. Controller 60 does not any capability to store such images because of privacy concerns.

An internal camera 82 is also provided which is mounted above the guide member structure 90 of card reader 10 which generates an image of the upper surface of the guide member structure 90 (FIG. 3) for controller 60. Internal camera 82 may include one or more lighting elements (e.g., an LED unit) to illuminate the guide member structure 90 in order to ensure that a good quality image is obtained. Alternatively, internal camera 82 may be a low light image sensor so that no additional lighting is required. Internal camera 82 and external camera 80 are, like controller 60, configured so that each does not have any capacity to store images—thereby reducing potential security risks and protecting the privacy of each customer's information. Controller 60 receives and processes images from internal camera 82 (as explained below) to order to determine if a deep insert skimmer or other type of foreign structure has been inserted into the main housing 20 by bad actors. Internal camera 82 is preferably located centrally at a top portion of card reader 10 in order to view as much of the guide member structure 90 as possible. The internal camera 82 may include a wide angle lens to further ensure that all of the guide member structure 90 is viewed.

Figure 5:
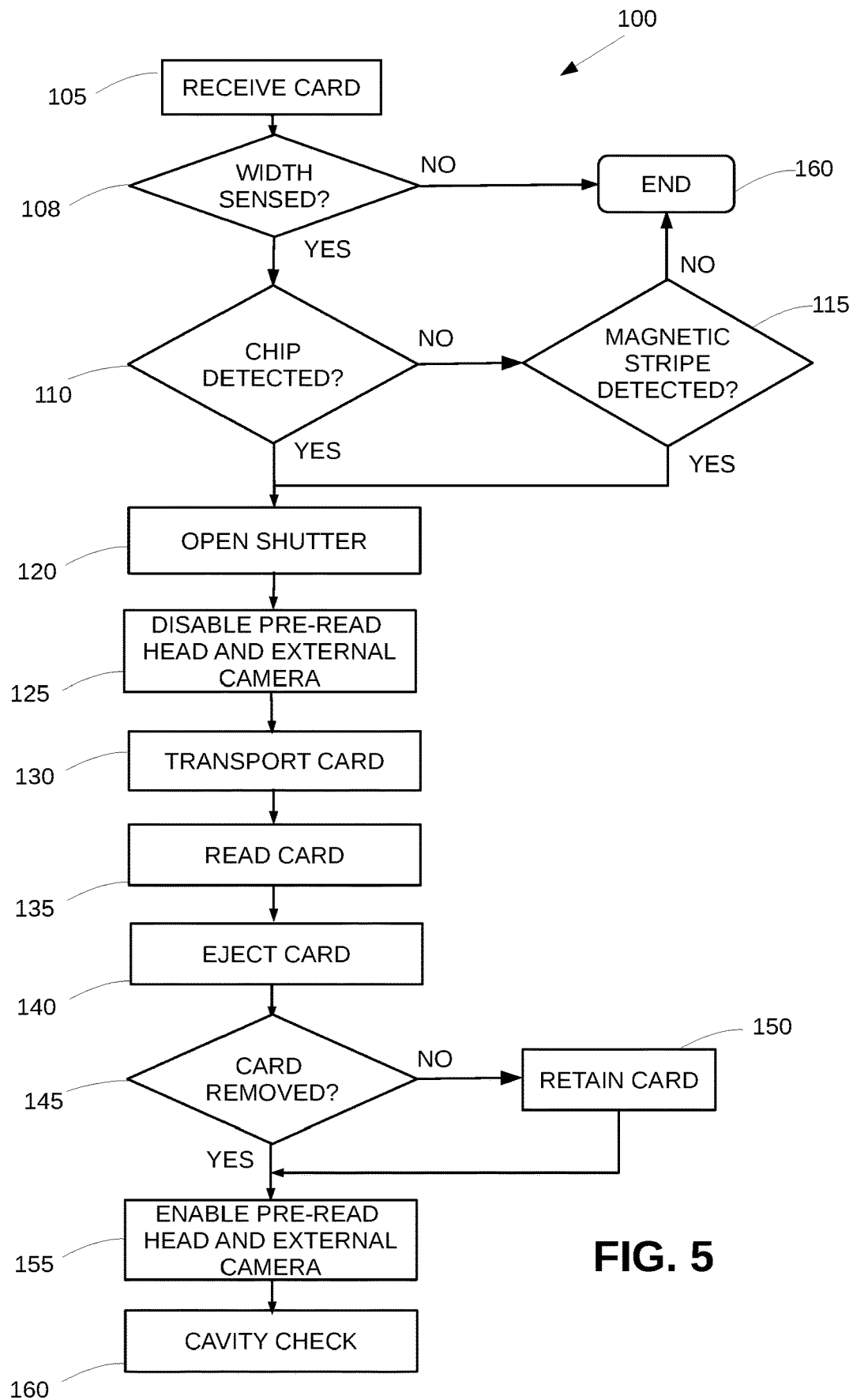
FIG. 5 is a flowchart showing the operation of the motorized card reader of FIGS. 1 and 2.

The controller 60 (shown in FIG. 2) receives the signals from the various sensors and processes such signals as explained below with respect to the flowchart 100 shown in FIG. 5. Controller 60 may control the operation of shutter 26 to selectively open and close. The card entrance housing 22 may include a shutter detect sensor 40 for detecting whether the shutter 26 is open or closed.

Referring specifically to FIG. 2, the main housing 20 includes a linear transport mechanism 42 comprising four pairs of rollers 44, 46, 48, 50 and associated stretchable endless belts (not shown) for transporting the inserted card along the guide member structure 90 when it is at least partially within the main housing 20. The main housing 20 defines an entrance/exit slot 52 at one end and a card retention slot 54 at the opposite end (which may lead to a small storage bin). The main housing 20 also includes a card read/write head 56 for reading data from a magnetic stripe card and writing data to a magnetic stripe card as necessary. The main housing 20 also includes a chip reader unit 58 for reading data from a chip-based smart card and writing data to the chip-based smart card as necessary. Card read/write head 56 and chip reader unit 58 each constitutes a reader device for reading information from a card. The main housing 20 also includes multiple sensors (not shown) for accurately locating the position of the magnetic stripe card or the chip-based smart card within the main housing 20. Controller 60 is also provided within, or coupled to, the main housing 20 to control the operation of the other components of the card reader 10, such as the shutter 26, the sensors (i.e., the input read head 30, the card width detection sensor 28, the external camera 80, and the internal camera 82), the linear transport mechanism 42, the magnetic stripe read/write head 56, and the chip reader unit 58.

Figure 3:
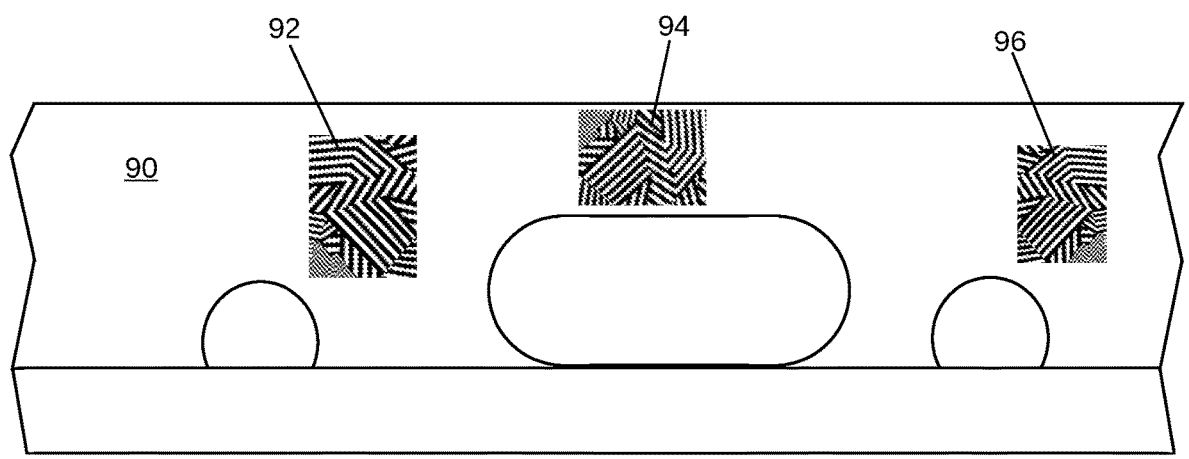
FIG. 3 is a top view of a guide member structure included within the motorized card reader of FIGS. 1 and 2.

Referring now to FIG. 3, a top view of a portion of the guide member structure 90 is shown that is part of the linear transport mechanism 42 of FIG. 2 and represents the portion of the guide member structure between the input slot 22 and the read/write head 56 or the chip reader unit 58. The guide member structure 90 is shown with three distinctive patterns 92, 94, 96 placed thereon, e.g., printed or etched directly or via stickers adhered thereto. The patterns 92, 94, 96 shown in FIG. 3 are dazzle patterns (complex patterns of geometric shapes in contrasting colors interrupting and intersecting each other), but other distinctive patterns may be used. Although three different patterns are shown in FIG. 3, in some cases more may be provided and in some cases less may be necessary, as discussed below. The number of different patterns used can be low, but by changing the position and rotational orientation of each pattern in each card reader 10, a large set of pseudo-randomized backgrounds can be generated in order to ensure that bad actors cannot easily duplicate the patterns by, for example, reverse engineering the card reader 10. For example, when three different distinctive patterns are used, each pattern can be used in one of the three possible positions and each pattern can also be rotated, thereby providing a large number of different backgrounds so that each manufactured card reader 10 may have a unique background thereby ensuring that inserted foreign objects will be able to be detected. The guide member structure 90 is used to guide the inserted bank card to the card read/write head 56 or the chip reader unit 58. Any inserted foreign structure for reading a bank card would necessarily be between the input slot 24 and the read/write head 56 or the chip reader unit 58 and would cover one or more of the patterns 92, 94, 96 on guide member structure 90. Although the patterns 92, 94, 96 are shown only on guide member structure 90, in other embodiments, such patterns may be placed on any other internal structure within card reader 10 which could possibly be obstructed when a foreign body (such as a deep insert skimmer) is inserted therein.

Figure 4:
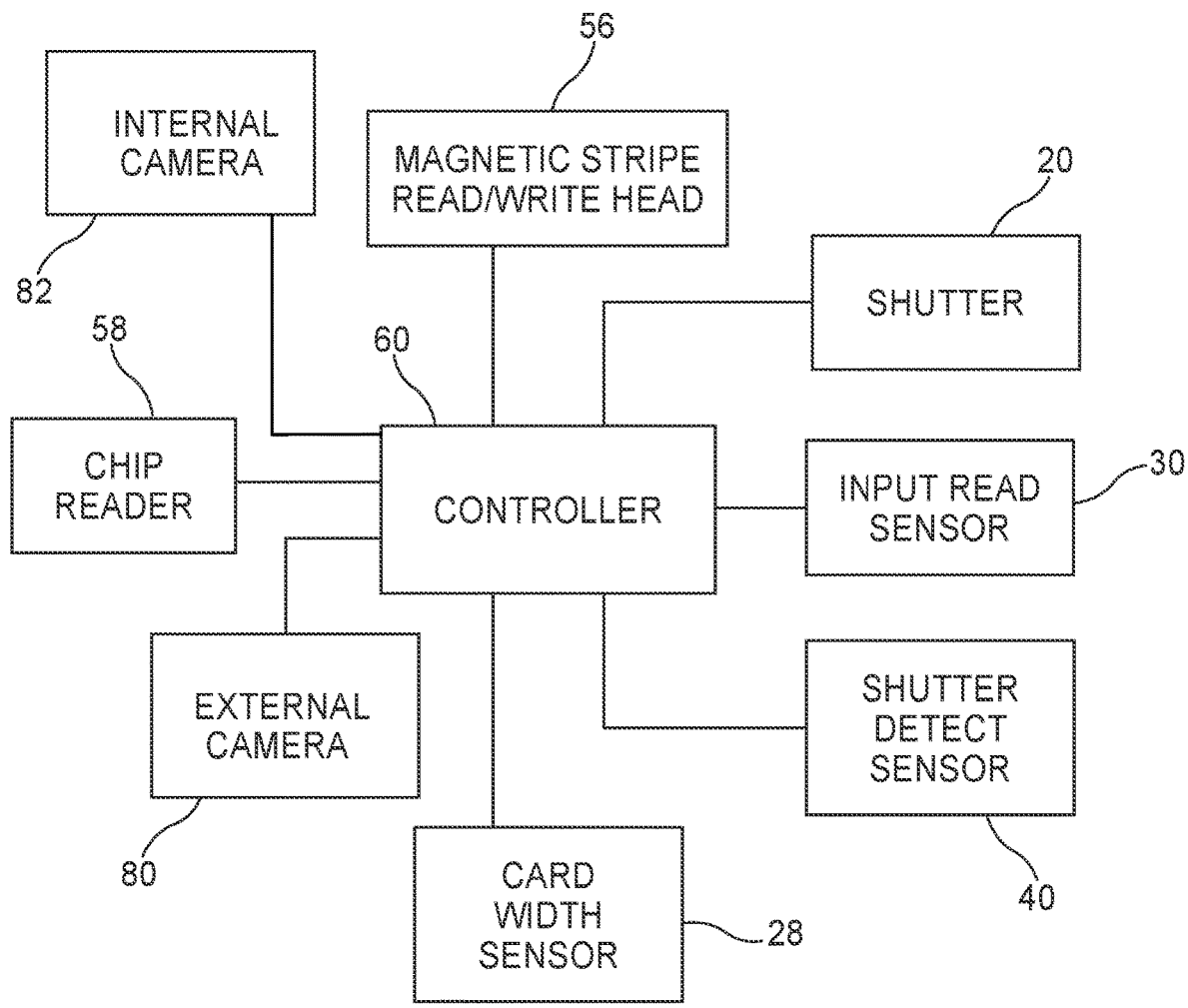
FIG. 4 is a simplified block diagram of the motorized card reader of FIGS. 1 and 2.

Referring now to the block diagram of FIG. 4, controller 60 is coupled to the input read head 30, the card width detection sensor 28, the external camera 80, and the internal camera 82. Controller 60 is also coupled to the shutter 26 to control whether the inserted bank card is accepted into main housing 20 by controlling whether the shutter 26 is positioned in an open position or a closed position (the position shown in FIG. 1). Controller 60 is coupled to and receives a feedback signal from shutter detect sensor 40 indicating whether the shutter is in an open or closed position. Finally, controller 60 is coupled to the magnetic stripe read/write head 56 and to the chip reader unit 58.

The operation of the card reader 10 will now be described with reference to the flowchart 100 of FIG. 5, which illustrates the steps involved in performing a transaction at a self-service terminal based on an inserted bank card and then testing after the bank card has been returned to the user (or stored in a storage bin) to verify that no foreign structure has been inserted into the card reader 10. Although the steps described in flowchart 100 illustrate how a card reader 10 operates to accept and read magnetic stripe cards and chip-based smart cards, the key part is that regular testing is performed to verify that no foreign structures have been inserted into the card reader 10. In the flowchart shown in FIG. 5, the regular testing is done after every transaction. In other embodiments, the testing maybe be done on a periodic basis (e.g., once an hour). The steps and structures used in relation to the acceptance and reading of magnetic stripe cards and chip-based smart cards are shown and described as environment only, and the internal camera 82 and controller 60 may alternatively operate in a standalone configuration within a card reader 10, separate from any structures used to perform a self-service terminal transaction based on an inserted bank card.

Initially, a customer inserts a bank card into the card entry slot 24 of the card entrance housing 22 of card reader 10, so that the card reader 10 receives the inserted bank card at step 105.

The controller 60 continually monitors the card width detection sensor 28 at step 108. If the card width detection sensor 28 is not deflected then the controller 60 takes no action and processing ends at step 160. Insertion of the bank card deflects the card width detection sensor 28, which sends an output to the controller 60 indicating that the inserted bank card (a magnetic stripe card or a chip-based smart card) has the correct width. In some embodiments, the card width detection sensor 28 may be omitted when, for example, the insertion slot is designed to only accept bank cards having a particular width. When the card width detection sensor 28 is omitted, step 208 is not necessary.

The controller 60 may then receive a camera image from the external camera 80 and process the image to determine if the inserted bank card includes a chip in the expected position on the surface of the card at step 110. If the controller 60 determines that the inserted bank card does include a chip in the expected position (i.e., that the inserted bank card is a chip-based smart card in the proper orientation) and the card width detection sensor 28 remains deflected then controller 60 opens the shutter 26 at step 120. Otherwise, controller 60 ascertains if the input read head 30 detects any magnetic flux at step 115. The input read head 30 will detect magnetic flux on the magnetic stripe card if the magnetic stripe card is oriented correctly when it is inserted. If no magnetic flux is detected then the controller 60 takes no action and processing ends at step 160. If magnetic flux is detected and the card width detection sensor 28 remains deflected then the controller 60 opens the shutter 26 at step 120.

The controller 60 then disables the input read head 30 and external camera 80 at step 125. Once the input read head 30 and external camera 80 have been deactivated, the controller 60 transports the inserted bank card within the main housing 20 at step 130 and allows the shutter 26 to urge against the top of the bank card so that when the bank card clears the shutter 26, the shutter 26 will automatically close.

Once the bank card is fully enclosed by the main housing 20, and the shutter 26 is fully closed, the controller 60 reads the bank card for use in a transaction at step 135. The bank card is read using magnetic stripe read write head 56 when the inserted bank card is a magnetic stripe card. The bank card is read using chip reader unit 58 when the inserted bank card is a chip-based smart card. In some cases, a chip-based smart card may also include a magnetic stripe to allow the card to be used with older card readers not designed to work with such smart cards. Card reader 10 will always default using the chip reader unit 58 even if the inserted bank card has both a chip and a magnetic stripe.

When the current transaction is completed, the controller 60 then ejects the bank card at step 140 using the linear transport mechanism 42 to present the bank card to the customer. The controller 60 ascertains if the bank card is removed by the customer at step 145, for example, by detecting closure of the shutter 26 using the shutter detect sensor 40. If the customer does not take the bank card within a pre-determined time period (for example, fifteen seconds) then the card reader 10 transports the bank card to the card retention slot 54 for secure storage of the bank card (in an associated bin, for example) at step 150. The controller 60 then enables the input read head 30 and external camera 80 at step 155 (to prepare for the next transaction) and performs a cavity check at step 160 to determine whether a foreign object (such as a deep insert skimmer) has been inserted into the card reader 10.

The cavity check performed at step 160 is done by comparing a reference image, generated during manufacturing for example, with a currently acquired image. Internal camera 82 generates the currently acquired image based on a signal from controller 60. This signal may be provided on a transactional basis, i.e., after the completion of every user transaction as shown in the flowchart 100 of FIG. 5, or may be provided periodically on a time basis (e.g., every hour). This comparison may be done by an image processing module running on controller 60. When the comparison determines that reference image is different from the currently acquired object, it signifies that a foreign object has been found within the internal cavity of card reader 10. The addition of the distinctive patterns 92, 94, 96 ensures foreign objects will be easy to detect when placed over one or more of such patterns. Bad actors could attempt to create deep insert skimmers that have a similar appearance to the internal background structures in the card reader 10 in order to circumvent camera-based internal foreign-object detectors by reverse engineering a sample card reader 10. By using different distinctive patterns (including different patterns and/or rotated common patterns) on the background structures in internal locations of each card reader 10, this type of attempt by bad actors is easily thwarted since each card reader 10 will have a different reference image. The reference image is generated during the manufacturing process or during installation of card reader 10 into a self-service terminal. When the cavity check step is performed, a determination will be made if a foreign object is present within card reader 10 as discussed with respect to FIG. 6.

Figure 6:
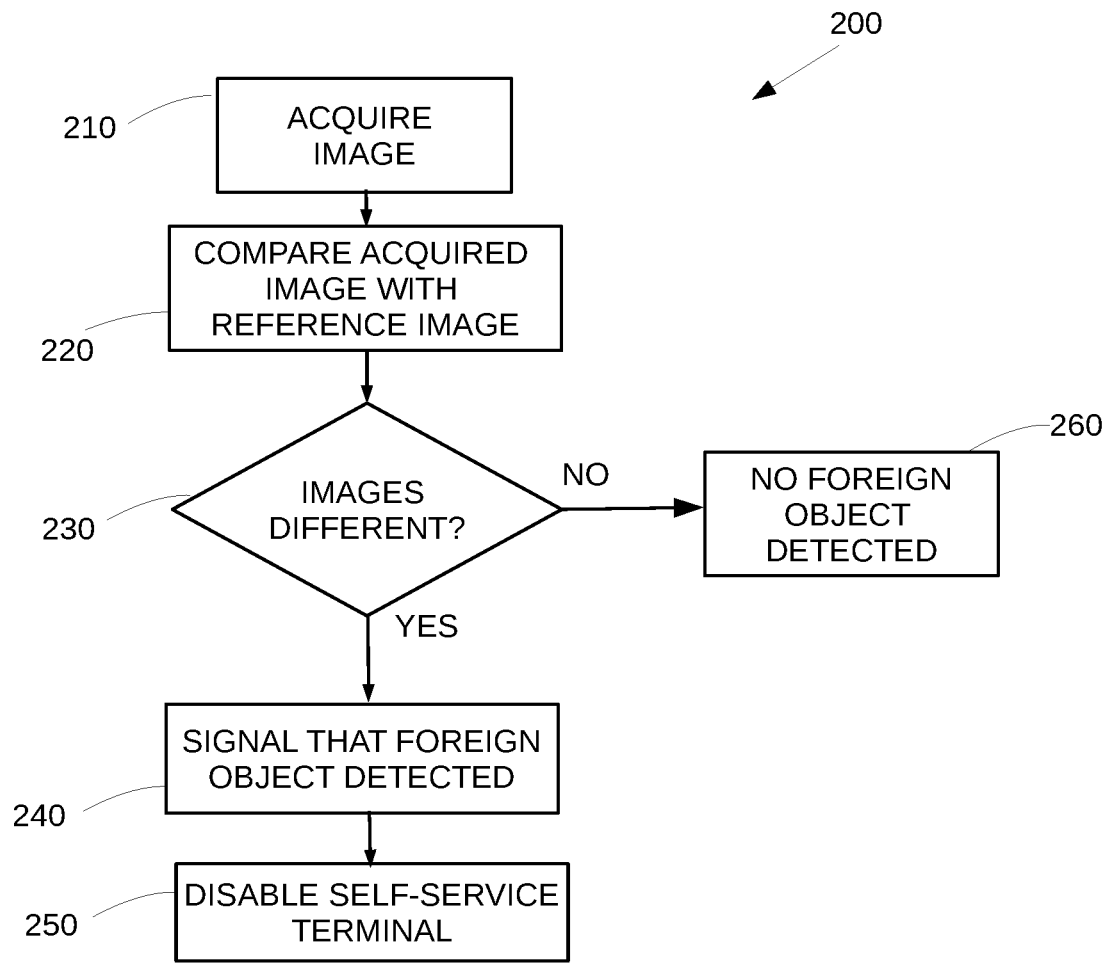
FIG. 6 is a flowchart showing the steps performed in the cavity check process of the present disclosure.

The steps performed in the cavity check are shown in the flowchart 200 of FIG. 6. First, at step 210, an image is acquired, via internal camera 82, of an internal portion of the card reader 10. This image is compared with a reference image, using for example an image processing module running on controller 60, at step 220. A determination is made, at step 230, whether the reference image is different from acquired image based on the comparison made in step 220. If the images are not different, processing proceeds to step 260 which ends the currently performed cavity check processing. If the images are found to be different at step 230, processing proceeds to step 240, where an alert signal is generated indicating that a foreign object has been detected within card reader 10. This can result in a service call or other type of maintenance being performed at the self-service terminal in order to remove or otherwise investigate the presence of the foreign object within the card reader 10. The self-service terminal associated with card reader 10 may also disabled to prevent any further skimming activity, for example, at step 250.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A card reader, comprising:
   a housing having an internal portion and a card entry slot formed therein;
   a reader device for reading information from a card, the reader device mounted within the internal portion of the housing;
   a transport mechanism within the internal portion of the housing for receiving a card via the card entry slot and transporting the card to the reader device, the transport mechanism including a structure having one or more distinctive patterns on an upper surface thereof, each distinctive pattern being a dazzle pattern;
   a camera mounted within the housing above the transport mechanism, the camera mounted in a position to allow an image to be taken of the upper surface of the guide member structure of the transport mechanism; and
   a controller coupled to the camera to receive images therefrom, the controller configured to compare each image received from the camera to a reference image to determine when a foreign object has been inserted into the internal portion of the housing.

2. The card reader of claim 1, wherein the structure having one or more distinctive patterns on an upper surface thereof is a guide member structure.

3. The card reader of claim 1, wherein the one or more distinctive patterns provide a unique background on the structure.

4. The card reader of claim 1, wherein the structure has three different distinctive patterns.

5. The card reader of claim 4, wherein each distinctive pattern is a different dazzle pattern.

6. The card reader of claim 1, wherein the reference image is generated during a manufacturing process.

7. The card reader of claim 1, wherein the reference image is generated during an installation process.

8. The card reader of claim 1, wherein the controller generates an alarm signal upon the determination that a foreign object has been inserted into the internal portion of the housing.

9. The card reader of claim 1, wherein the controller disables a self-service terminal associated with the card reader upon the determination that a foreign object has been inserted into the internal portion of the housing.

10. The card reader of claim 1, wherein the card reader device is a card read/write head or a chip reader unit.

11. The card reader of claim 1, wherein the controller provides the camera with a signal that causes the camera to generate an image.

12. The card reader of claim 11, wherein the signal is provided after each user transaction is completed.

13. The card reader of claim 11, wherein the signal is provided on a periodic basis.

14. A self-service terminal, comprising:
a card reader, the card reader comprising:
a housing having an internal portion and a card entry slot formed therein;
a reader device for reading information from a card, the reader device mounted within the internal portion of the housing;
a transport mechanism within the internal portion of the housing for receiving a card via the card entry slot and transporting the card to the reader device, the transport mechanism including a structure having one or more distinctive patterns on an upper surface thereof, each distinctive pattern being a dazzle pattern;
a camera mounted within the housing above the transport mechanism, the camera mounted in a position to allow an image to be taken of the upper surface of the guide member structure of the transport mechanism; and
a controller coupled to the camera to receive images therefrom, the controller configured to compare each image received from the camera to a reference image to determine when a foreign object has been inserted into the internal portion of the housing.

15. A method of detecting a foreign object within a card reader, comprising:
generating an image of an internal portion of the card reader, the internal portion including a structure having one or more distinctive patterns on an upper surface thereof, each distinctive pattern being a dazzle pattern;
comparing the generated image with a reference image;
determining that a foreign object has been inserted into the card reader based on the comparison of the generated image with the reference image; and
generating an alarm signal upon the determination that a foreign object has been inserted into the card reader.

16. The method of claim 15, wherein the one or more distinctive patterns provide a unique background on the structure.

17. The method of claim 15, wherein the structure has three different distinctive patterns.

18. The method of claim 17, wherein each distinctive pattern is a different dazzle pattern.

* * * * *